Sept. 1, 1925.
S. B. COLEY
1,551,977
BRAKE BAND AND LINER THEREFOR
Filed Jan. 31, 1925
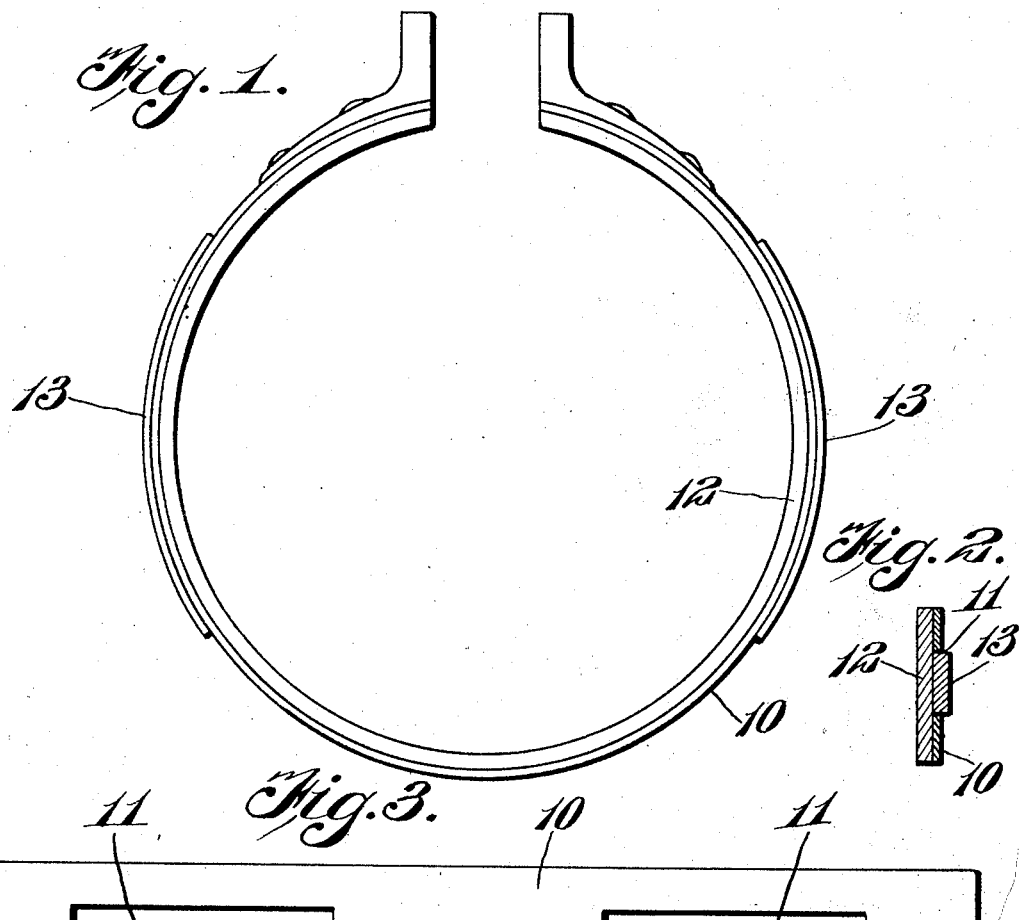
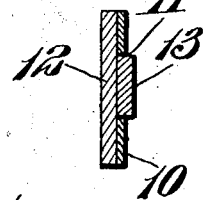
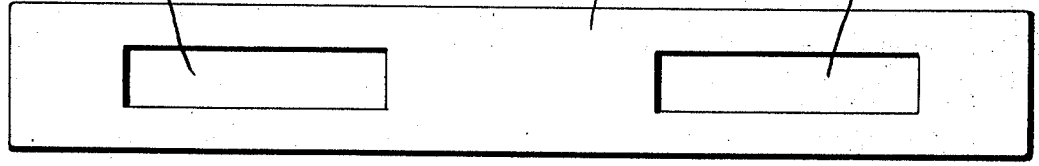
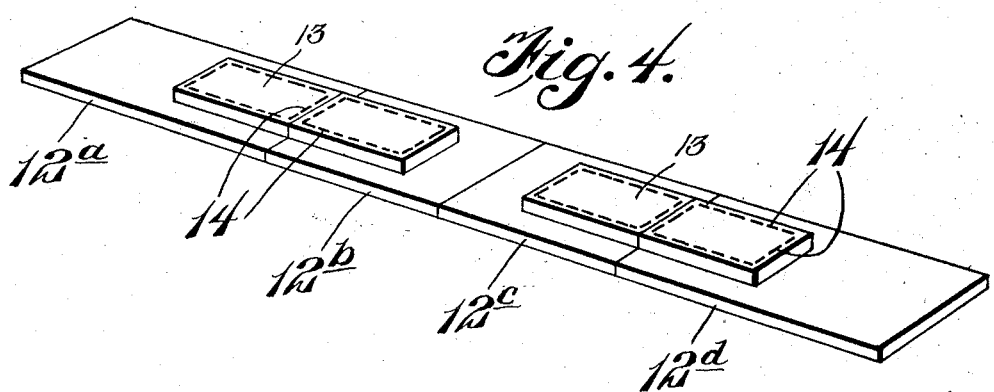
Inventor
Samuel B. Coley
Watson E. Coleman
Atty Patented Sept. 1, 1925.

1,551,977

UNITED STATES PATENT OFFICE.

SAMUEL B. COLEY, OF HOISINGTON, KANSAS.

BRAKE BAND AND LINER THEREFOR.

Application filed January 31, 1925. Serial No. 6,087.

*To all whom it may concern:*

Be it known that I, SAMUEL B. COLEY, a citizen of the United States, residing at Hoisington, in the county of Barton and State of Kansas, have invented certain new and useful Improvements in Brake Bands and Liners Therefor, of which the following is a specification, reference being had to the accompanying drawings.

This invention relates to improvements in brake bands and has for an important object thereof the construction of a brake band, the lining of which is so mounted that it may be removed by simply loosening the band and in which this lining, during operation, is firmly held against displacement either longitudinally or transversely of the band.

A still further object of the invention is to provide a device of this character in which the lining of the band is capable of application by a person totally unskilled in mechanics and with a loss of but a few minutes time.

A still further object of the invention is to provide in combination a brake band having openings and the lining for this band having lugs or projections for engagement with these openings to hold the lining in engagement with these bands, these lugs constituting the sole means of connection of the lining and band.

These and other objects I attain by the construction shown in the accompanying drawings, wherein for the purpose of illustration is shown a preferred embodiment of my invention and wherein:—

Figure 1 is a side elevation of a brake band constructed in accordance with my invention;

Figure 2 is a detailed sectional view through the band;

Figure 3 is a view of the body of the brake band showing the openings formed therein; and Figure 4 is a perspective of one form of liner.

Referring now more particularly to the drawings, the numeral 10 designates a brake band, the flat metallic body portion of which is provided with longitudinally spaced longitudinally extending slots 11 extending entirely through this body. This band may be either the band of a brake or the ordinary control bands employed in well known types of transmissions and clutches. The slots may be formed with the bands now in use by removing the bands and punching or cutting away the metal of the body at the desired point.

The lining, indicated at 12, has secured thereto flanges 13 corresponding in number and arrangement to the openings or slots 11 of the band. These flanges closely fit the openings or slots 11 and will engage therein to prevent movement of the lining with relation to the band either transversely or longitudinally. By employing elongated openings such as suggested in the drawings, the liner may be formed in a plurality of sections $12^a$, $12^b$, $12^c$ and $12^d$ and these sections separately inserted. It will be noted that the sections from which the band is formed are exactly similar and that accordingly it may be produced at a relatively low cost and may be inserted without fear of having these sections improperly arranged. The flanges 13 are preferably secured to the lining by stitching 14 extending through the flanges and lining. By employing this method of attaching the flanges, the inner lining is free from metallic portions which might come into contact with the drum with which the band coacts.

Many changes being possible in the construction hereinbefore set forth, I do not limit myself to such specific structure except as hereinafter claimed.

I claim:—

1. In combination with a brake band provided in the body thereof with longitudinally extending slots, a lining therefor having stitched thereto flanges corresponding in number and arrangement to the openings and extending into and fitting the openings to form the sole means of connection between the band and lining.

2. In combination with a brake band provided in the body thereof with longitudinally extending slots, a lining therefor having stitched thereto flanges corresponding in number and arangement to the openings and extending into and fitting the openings to form the sole means of connection between the band and lining, said lining being formed in a plurality of sections, each section bearing one half of one of said flanges.

In testimony whereof I hereunto affix my signature.

SAMUEL B. COLEY.